United States Patent Office 3,763,114
Patented Oct. 2, 1973

3,763,114
PREPARATION OF A THERMOSETTABLE POLYIMIDE
Gerald Michael Saluti, Norwalk, and Roland Ralph Dileone, Rowayton, Conn., assignors to American Cyanamid Company, Stamford, Conn.
No Drawing. Filed July 22, 1971, Ser. No. 165,385
Int. Cl. C08g 20/00, 20/32
U.S. Cl. 260—78.4 R
10 Claims

ABSTRACT OF THE DISCLOSURE

This invention relates to rapid-curing, stable, moldable polyimides. More particularly, it relates to rapid-curing, stable, moldable, fully imidized polyimides formed from a suitable dianhydride, methylenedianiline and maleic anhydride. Still more particularly, the invention is concerned with rapid-curing, stable, moldable, fully imidized polyimides formed from a suitable dianhydride, methylenedianiline, and maleic anhydride in the presence of a dimethylformamide imidizing mixture.

It is known that polyimide polymers, which are stable and rapid-curing, can be readily prepared by end-capping relatively low molecular weight polyimide molecules with specific monoanhydrides which are reactive at elevated temperatures as set forth in United States Letters Patent No. 3,528,950. Unfortunately, such polyimides are insoluble in all known solvents when in the fully imidized state, requiring that partial imidization must be carried out in the solid state prior to molding of said polymer. The latter treatment frequently results in incompletely imidized as well as partially cured compositions which impart to molded articles blisters or voids. If a polyimide polymer can be provided which is soluble in the fully imidized state, that is, a polyimide polymer requiring no imidizing treatment in the solid state prior to molding, and further providing molded specimens free of blisters and voids, such would fulfill a long-felt need in the art.

It is a principal object of the invention to provide a polyimide polymer which is soluble in the fully imidized state. It is a further object to provide a polyimide polymer which is thermally stable, rapid-curing, and moldable. Other objects and advantages will appear from a consideration of the ensuing description.

To this end, it has been unexpectedly found that polyimide polymers may be obtained from the coreaction of a suitable dianhydride, methylenedianiline, and maleic anhydride in at least stoichiometric amounts and in the presence of an imidizing mixture consisting of dimethylformamide, aceticanhydride and an alkali metal acetate. In so proceeding, there is prepared a polyimide polymer which, when compression-molded under heat, will produce molded articles free of voids and blisters while retaining all the high desirable properties attributed to polyimide polymers.

According to the present invention, a dianhydride, formed by reacting maleic anhydride and certain vinyl benzenes, 4,4-methylenedianiline and maleic anhydride in at least stoichiometric amounts, are reacted to form the corresponding amide acid derivative and, thereafter, imidizing the latter with a mixture of dimethylformamide, acetic anhydride and an alkali metal acetate to effect complete imidazation. Resultant polyimide polymer is next compression-molded to form articles free from blisters and voids. Absent complete or total imidization, voids and blisters appear in the polyimide polymer product.

In general, the dianhydride, which is employed as one of the reactants, may be prepared, for instance, by a process disclosed in United States Letters Patent No. 3,410,876, issued to R. R. Di Leone, which is incorporated herein by reference. Utilizing styrene in the reaction with maleic anhydride, there is obtained 3,4-dicarboxy-1,2,3,4-tetrahydro-1-naphthalenesuccinic dianhydride sometimes called Tetralin dianhydride. However, other dianhydrides are contemplated. When employing, for instance, a lower-alkyl vinyl benzene in the reaction with maleic anhydride, there is obtained the corresponding 5-, 6-, 7-, or 8- lower-alkyl 3,4-dicarboxy-1,2,3,4 - tetrahydro - 1 - naphthalenesuccinic dianhydride. If the alkyl vinyl benzene starting material is a mixture of isomers then the dianhydride product will correspondingly be a mixture of isomeric dianhydrides. As examples of dianhydrides in this category, there can be named 3,4-dicarboxy-1,2,3,4-tetrahydro-6-(and 7-)-methyl - 1 - naphthalenesuccinic dianhydride and 3,4-dicarboxy-1,2,3,4-tetrahydro - 6 - (and 7-)-butyl - 1 - naphthalenesuccinic dianhydride. Further, when using a divinyl benzene, such as m-divinyl benzene either in a pure form or admixed with p-divinyl benzene and/or o-divinyl benzene in the reaction with maleic anhydride, there is obtained a dianhydride based upon phenanthrene, i.e., the compound 3,4,7,8-tetracarboxy-1,2,3,-4,5,6,7,8-octahydrophenanthrene 3,4; 7,8-dianhydride.

Resultant dianhydride is reacted with sufficient 4,4'-methylenedianiline and maleic anhydride, whereby the latter enters into chemical combination with the dianhydride to form the corresponding intermediates: amide acid groups. Ring closure to the corresponding imide groups is next accomplished by means of a three-component ring-closing imidizing mixture consisting of (a) dimethylformamide, (b) acetic anhydride and (c) alkali metal acetate, such as sodum acetate potassium acetate, and lithium acetate.

The overall reactions may be written as follows:

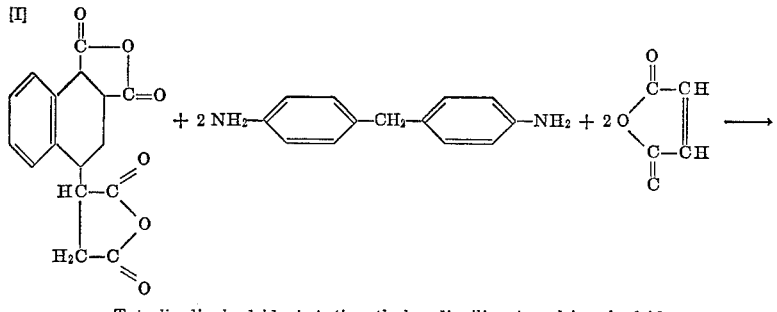

Tetralin dianhydride + 4, 4' methylenedianiline + maleic anhydride

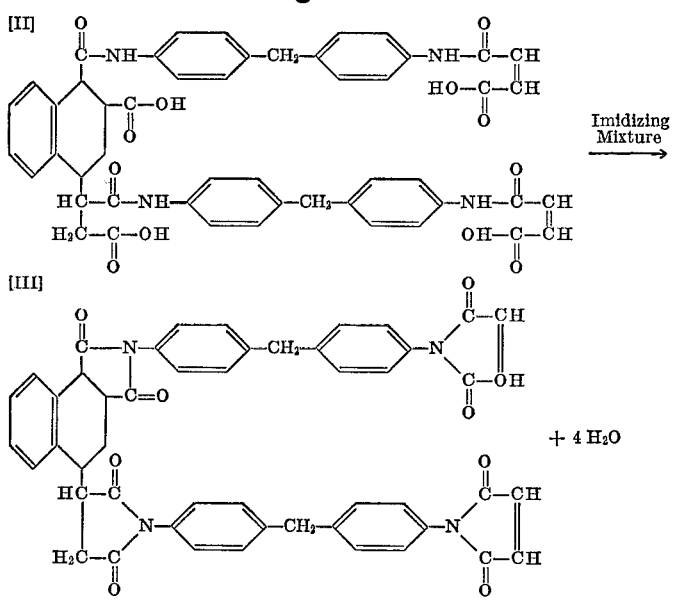

Moldable polyimide resin

The utilization of the imidizing mixture is critical, for otherwise, complete imidization does not occur. The use of acetic anhydride and an alkali metal acetate absent dimethylformamide as a cyclizing reagent for the removal of water, for instance, does not and cannot effect complete imidization which is required for compression-molding.

Advantageously, a wide range of proportions is contemplated for the three-component cyclizing mixture. Thus, the dimethylformamide utilized should be present in amounts ranging from equal weight to a 100% weight excess, based on the weight of the prepared polymer. Insofar as acetic anhydride is concerned, a good practice is to employ from about one to about three mols of the anhydride per mol of the amide acid to be imidized. The third component, namely, the alkali metal acetate, such as sodium acetate or potassium acetate, is found to be highly effective at a level ranging from about 1% to about 30% of the acetic anhydride content and, preferably, from between 8% and 12%.

Amide acid and maleamic acid formation takes place at temperatures ranging from 20° C., to 100° C., while imidization occurs over a similar wide range of temperatures, usually from 30° C. to 150° C. Advantageously, hydroquinone is employed to inhibit any cross-linking of the polyimide during its preparation. In general, from 0.05% to 1.0% of hydroquinone, based on polymer weight, is found to be satisfactory. Further, when freshly distilled dimethylformamide is used, it is noted that no pre-cross-linking occurs. Unfortunately, any pre-cross-linking causes insolubilization of the polymer with resultant precipitation from solution.

It is a good practice to react (a) from one to two mols of the dianhydride reactant, (b) from two to three mols of 4,4'-methylenedianiline, and (c) two mols of maleic anhydride. Thus, for instance, reacting one mole of tetralin dianhydride, two mols of 4,4'-methylenedianiline, and two mols of maleic anhydride, there is obtained a polyimide having a molecular weight of approximately 835. Where two mols of Tetralin dianhydride, three mols of 4,4'-methylenedianiline, and two mols of maleic anhydride are reacted, a polyimide having a molecular weight of about 1,300 is prepared. Such polyimides are fully imidized and capable of being molded.

Resultant polyimide polymer may be cured either in the presence or absence of a suitable filler. Where a filler, such as chopped glass fiber, Teflon powder, graphite powder, and the like is employed, the latter is incorporated in the unfilled polyimide polymer by dissolving the polymer in a suitable solvent, such as methylene chloride, adding the filler to the solution, and then evaporating off the solvent. In general, from about 5% to about 90% of filler and, preferably, from about 10% to 70%, based on the weight of the polymer, may be used.

Compression-molding may be accomplished in any known manner at temperatures ranging from about 150° C. to about 350° C. at pressures ranging from 2,000 to 8,000 p.s.i. If desired, catalysts may be employed to effect rapid cross-linking and, therefore, improved molding cycles. Illustrative of the catalysts are: t-butylhydroperoxide, dicumyl peroxide, and t-butylperoxide.

The following examples are presented as illustrative and are not intended to be limitative of the invention. Unless otherwise stated, the parts and percentages are by weight.

EXAMPLE 1

To a suitable reaction vessel, there are added to 750 parts of dimethylformamide 198 parts of 4,4'-methylenedianiline (1.0 mol). One hundred fifty parts of tetralin dianhydride (0.50 mol) are added slowly to this solution, maintaining the temperature at 50° C. by the slow addition. The solution is stirred for 15 minutes. Ninety-eight parts of maleic anhydride (1.0 mol) are then added slowly, maintaining a temperature of 50° C. After addition has been completed, 20 parts of hydroquinone are added to the solution and an air tube attached to the reaction vessel, the tube extending below the solution surface, and 0.2 liter of air per minute is pumped through the solution. The solution is stirred vigorously for an additional 30 minutes, and 714 parts of acetic anhydride (7.0 mols) and 60 parts of sodium acetate (0.7 mol) are then added. The solution is heated to 90° C. and heating is discontinued. An exotherm brings the solution temperature to 96° C. The solution is then allowed to cool to room temperature (~1½ hours) and a polymer precipitates in a mixture of five parts of water to one part of polymer solution. The polymer is isolated as a light brown powder which was washed twice with water, three times with methanol, and vacuum oven dried for 16 hours at 80° C., 30 inches vacuum. Yield of powder was 96%. When melted, it flowed with difficulty.

EXAMPLE 2

The procedure of Example 1 is followed in every respect except that two mols of tetralin dianhydride, three mols of 4,4'-methylenedianiline, and two mols of maleic anhydride are employed to prepare a polyimide having a molecular weight of about 1,300 and being obtained in quantitative yields.

COMPARATIVE EXAMPLE 3

Repeating Example 1 in every detail except that dimethylformamide is omitted, resultant polymer is incompletely imidized and cannot be molded because of substantial foaming and blistering.

EXAMPLE 4

A portion of the polymeric powder of Example 1 is employed in filling a compression-molding apparatus, and ocmpression moldings are effected at a temperature of about 250° C. using a six-minute cycle at a pressure of about 5,000 p.s.i. The remaining portions are filled and tested as indicated in Table I below. No blisters or voids appear when using the resin of Example 1. The polyimide of Example 3 clearly indicates the presence of voids and blisters when so-cured and could not be molded into useful specimens.

TABLE I

| | Tensile strength (in p.s.i.) | Elongation (percent) | Flexural strength (in p.s.i.) | Flexural modulus (in p.s.i.) | D.T.L.* ° C. |
|---|---|---|---|---|---|
| Unfilled Polymer of Example 1 | 6,770 | 3.6 | 10,700 | 495,000 | >250 |
| 40% ¼″ glass-filled | 8,800 | .6 | 16,700 | 1,310,000 | >250 |
| 50% ¼″ glass-filled | 10,800 | .5 | 24,000 | 1,690,000 | >250 |
| 60% ¼″ glass-filled | 12,800 | .5 | 26,200 | 2,170,000 | >250 |
| 70% ¼″ glass-filled | 17,300 | .6 | 39,800 | 3,460,000 | >250 |
| 10% Teflon-filled | 5,800 | | 6,500 | 40,000 | >250 |
| 10% graphite-filled | 3,000 | | 4,000 | 590,000 | >250 |
| Unfilled polymer of Example 3 | (¹) | | | | |

¹ Cannot be molded.
* D.T.L. means deformation temperature under a load of 264 p.s.i.

We claim:

1. A completely imidized moldable polyimide obtained by reacting at least stoichiometric amounts of a dianhydride, 4,4′-methylenedianiline and maleic anhydride.

2. The moldable polyimide of claim 1 wherein the dianhydride is 3,4 - dicarboxy - 1,2,3,4 - tetrahydro-1-naphthalenesuccinic dianhydride.

3. The moldable polyimide of claim 2 wherein one mol of said dianhydride, two mols of the maleic anhydride, and two mols of the 4,4′-methylenedianiline are reacted.

4. The moldable polyimide of claim 2 wherein two mols of the dianhydride, three mols of the methylenedianiline, and two mols of the maleic anhydride are reacted.

5. A blister-free and void-free molded article obtained by heating under compression the polyimide of claim 1.

6. A blister-free and void-free molded article obtained by heating under compression the polyimide of claim 2.

7. A process for preparing a completely imidized moldable polyimide of claim 1 which comprises the steps of: reacting at a temperature between 30° C. and 150° C. a dianhydride, methylenedianiline and maleic anhydride in substantially stoichiometric amounts to form the corresponding amide acid derivative and, thereafter, imidizing the latter in the presence of an imidizing mixture consisting of dimethylformamide, acetic anhydride and an alkali metal acetate, to effect complete imidization and recovering resultant polyimide.

8. The process according to claim 7 wherein the dimethylformamide is present in a weight amount equal to the weight of the recovered polyimide resin.

9. The process according to claim 7 wherein the polyimide is formed by reacting at least stoichiometric amounts of dianhydride, 4,4′ - methylenedianiline, and maleic anhydride.

10. The process according to claim 7 wherein the dianhydride is 3,4 - dicarboxy - 1,2,3,4 - tetrahydro-1-naphthalenesuccinic dianhydride.

References Cited

UNITED STATES PATENTS

| | | | |
|---|---|---|---|
| 3,528,950 | 9/1970 | Lubowitz | 260—78.4 |
| 3,632,428 | 1/1972 | Lubowitz et al. | 117—161 |
| 3,179,630 | 4/1965 | Endrey | 260—78 |
| 3,179,632 | 4/1965 | Hendrix | 260—78 |
| 3,179,634 | 4/1965 | Edwards | 260—78 |

JOSEPH L. SCHOFER, Primary Examiner

J. KIGHT III, Assistant Examiner

U.S. Cl. X.R.

117—161 P, UN; 260—78 R, TF 24,070

UNITED STATES PATENT OFFICE
CERTIFICATE OF CORRECTION

Patent No. 3,763,114          Dated October 2, 1973

Inventor(s) Gerald Michael Saluti, and Roland Ralph Dileone

It is certified that error appears in the above-identified patent and that said Letters Patent are hereby corrected as shown below:

Col. 3 line 71.    The word after "suitable" should be --filler-- instead of filer.

Col. 5 line 10.    The word "ocmpression" should be --compression".

Table I under the heading: "Flexural modulus (in p.s.i.)" line "70% 1/4" glass filled" should be --3,060,000-- instead of "3,460,000".

Table I under the heading: "Flexural modulus (in p.s.i.)" line "10% Teflon filled" should be --440,000-- instead of "40,000".

Signed and sealed this 1st day of January 1974.

(SEAL)
Attest:

EDWARD M. FLETCHER, JR.        RENE D. TEGTMEYER
Attesting Officer                 Acting Commissioner of Patents